United States Patent
Piedboeuf

(10) Patent No.: US 7,204,944 B2
(45) Date of Patent: Apr. 17, 2007

(54) PROCESS AND APPARATUS FOR CREATING COLOR EFFECTS IN EXTRUDABLE MATERIAL

(75) Inventor: Marie-Christine Piedboeuf, Dollard-des-Ormeaux (CA)

(73) Assignee: Pelican International Inc., Laval, Quebec (CA)

( * ) Notice: Subject to any disclaimer, the term of this patent is extended or adjusted under 35 U.S.C. 154(b) by 314 days.

(21) Appl. No.: 10/667,398

(22) Filed: Sep. 23, 2003

(65) Prior Publication Data
US 2005/0062185 A1    Mar. 24, 2005

(51) Int. Cl.
*B29C 47/04*    (2006.01)
(52) U.S. Cl. .......................................... 264/75; 264/73
(58) Field of Classification Search ................ None
See application file for complete search history.

(56) References Cited

U.S. PATENT DOCUMENTS

| | | | |
|---|---|---|---|
| 2,632,204 A * | 3/1953 | Murray ........................ 425/132 |
| 2,803,041 A | 8/1957 | Hill et al. |
| 2,985,556 A * | 5/1961 | Rowland ................ 156/244.25 |
| 3,405,425 A * | 10/1968 | Buckley et al. ........... 425/133.5 |
| 3,422,175 A | 1/1969 | Rowland |
| 3,715,420 A * | 2/1973 | Kiyono et al. ......... 264/173.19 |
| 3,743,250 A * | 7/1973 | Fitzhugh et al. ............. 366/337 |
| 3,792,945 A | 2/1974 | Randall |
| 3,920,366 A | 11/1975 | Randall |
| 4,011,292 A | 3/1977 | Randall |
| 4,072,791 A * | 2/1978 | Randall ....................... 428/221 |
| 4,093,188 A * | 6/1978 | Horner ........................ 366/336 |
| 4,164,385 A | 8/1979 | Finkensiep |
| 4,316,868 A | 2/1982 | Esposito et al. |
| 4,562,023 A | 12/1985 | Pabst et al. |
| 4,626,187 A | 12/1986 | Kamada |
| 4,680,155 A * | 7/1987 | Rochefort et al. ............. 264/73 |
| 4,753,766 A | 6/1988 | Pinsolle |
| 5,232,751 A * | 8/1993 | Cameron et al. .............. 428/15 |
| 5,998,006 A * | 12/1999 | Bambara et al. ......... 428/304.4 |
| 6,692,683 B2 * | 2/2004 | Gockel et al. .............. 264/515 |
| 6,863,967 B2 | 3/2005 | Cramer |
| 6,932,591 B2 | 8/2005 | Cramer |
| 2003/0003283 A1 | 1/2003 | Cramer |

FOREIGN PATENT DOCUMENTS

WO    WO 02/074843    9/2002

* cited by examiner

*Primary Examiner*—Mark Eashoo

(57) ABSTRACT

A process for creating color effects in extrudable material, such as plastic. The process includes the steps of providing a first flow of viscous material of a first color and a second flow of viscous material of a second color, the second color being different from the first color. Next, the first and second flows are combined to form a stream of viscous material, where the stream is characterized by a first band of the first color and a second band of the second color, the second band being adjacent to the first band. The stream of viscous material is fed through a static mixer such that, upon exiting the static mixer, the stream is further characterized by a third band of a third color, the third color being different from the first and second colors, the third band being located between the first and second bands.

18 Claims, 7 Drawing Sheets

PROCESS AND APPARATUS FOR CREATING COLOR EFFECTS IN EXTRUDABLE MATERIAL

FIELD OF THE INVENTION

The present invention relates generally to the field of extrusion processes. More specifically, the present invention relates to a process for creating color effects in extrudable material.

BACKGROUND OF THE INVENTION

Extrusion processes are commonly used in a variety of different industries, and with a multitude of different types and grades of material, for forming and shaping these materials into articles.

Extruded products, whether plastic, metal or some other material, are typically uniform in color. In some cases, the extruded products are formed of several layers of material, including one or more visible, outer layers and one or more hidden, inner layers, where these layers may differ in color.

In today's competitive market place, it is important for companies to have an edge that distinguishes their product from a competitor's product. One way to create a product that distinguishes itself from a competitor's product is to provide the product with an aesthetically pleasing appearance. Consumers are typically attracted to products having a visually appealing look.

In the field of extruded products, one method for giving the end products a visually appealing look is to create special color effects in the material of the product. Existing methods for producing color effects in extruded material, such as plastic for example, include lamination techniques, wherein multiple different layers of colored material are joined together to form a multi-colored sheet, and imprinting techniques wherein an imprinted film is adhered to the material. Unfortunately, these processes require treating the material after it has been extruded and formed. This can be both costly and time consuming.

As such, a need clearly exists in the industry to provide an improved method for producing visually appealing color effects in extrudable material, such as plastic and metal.

SUMMARY OF THE INVENTION

As embodied and broadly described herein, the present invention is directed to a process and apparatus for creating color effects in extruded material, such as plastic or metal.

In a broad aspect, the present invention provides a process for creating color effects in extrudable material, such as plastic. The process includes the steps of providing a first flow of viscous material of a first color and a second flow of viscous material of a second color, the second color being different from the first color. Next, the first and second flows are combined to form a stream of viscous material, where the stream is characterized by a first band of the first color and a second band of the second color, the second band being adjacent to the first band. The stream of viscous material is fed through a static mixer such that, upon exiting the static mixer, the stream is further characterized by a third band of a third color, the third color being different from the first and second colors, the third band being located between the first and second bands.

In a specific, non-limiting example of implementation, the process is implemented in a system for manufacturing plastic sheets. The system includes a die, a feed block and at least two extruders.

Each extruder is operative to mix and heat plastic granules, for producing a homogeneous, viscous plastic mixture. In the context of the present invention, at least two of the extruders must be producing plastic mixtures of different colors.

The feed block is operative to combine the flows of viscous plastic output by the different extruders into a single, multi-layer or multi-band, patterned stream of viscous plastic. At least one pair of adjacent bands of the multi-band stream generated by the feed block is characterized by bands of different colors.

Specific to the present invention, the multi-band stream of viscous plastic generated by the feed block is fed through a static mixer pipe. The static mixer is operative to act on the multi-band stream of viscous plastic, for partially mixing the adjacent bands of different colors in order to create a blended, gradation in the colors of the multi-band stream.

The die receives the multi-band stream of viscous plastic from the static mixer pipe, and is operative to shape the multi-band stream into its final product form, such as a sheet or a tube, among many other possibilities.

Under a second broad aspect, the present invention provides a system for creating color effects in extrudable material. The system includes a first extruder for providing a first flow of viscous material of a first color, and a second extruder for providing a second flow of viscous material of a second color, the second color being different from the first color. A feed block combines the first and second flows into a stream of viscous material, the stream being characterized by a first band of the first color and a second band of the second color, the second band being adjacent to the first band. The system also includes a static mixer for receiving the stream from the feed block. The static mixer is operative to partially mix the first and second bands of the stream such that, upon exiting the static mixer, the stream is further characterized by a third band of a third color, the third color being different from the first and second colors, the third band being located between the first and second bands.

Under a third broad aspect, the present invention provides an apparatus for creating color effects in extruded material. The apparatus includes an input for receiving a stream of viscous material, the stream being characterized by a first band of a first color and a second band of a second color, the second band being adjacent to the first band. The apparatus also includes a static mixer operative to mix at least a portion of the first band with at least a portion of the second band such that, upon exiting the static mixer, the stream is further characterized by a third band of a third color, the third color being different from the first and second colors, the third band being located between the first and second bands.

Under a fourth broad aspect, the present invention provides a system for creating color effects in extrudable material. The system comprises a first extruder, a second extruder, a feed block, a static mixer and a co-extruding device. The first and second extruder provide a first flow of viscous material of a first color and a second flow of viscous material of a second color that is different from the first color. The feed block combines the first and second flows into a stream of viscous material characterized by a first band of the first color and a second band of the second color that is adjacent to the first band. The static mixer receives the stream from the feed block and partially mixes the first and second bands such that upon exiting the static mixer, the stream is further characterized by a third band of a third color that is different from the first and second colors. The combining device then combines the stream characterized by a third color with at least one additional stream of viscous material provided by at least one additional extruder.

BRIEF DESCRIPTION OF THE DRAWINGS

A detailed description of examples of implementation of the present invention is provided hereinbelow with reference to the following drawings, in which.

Figure 1:
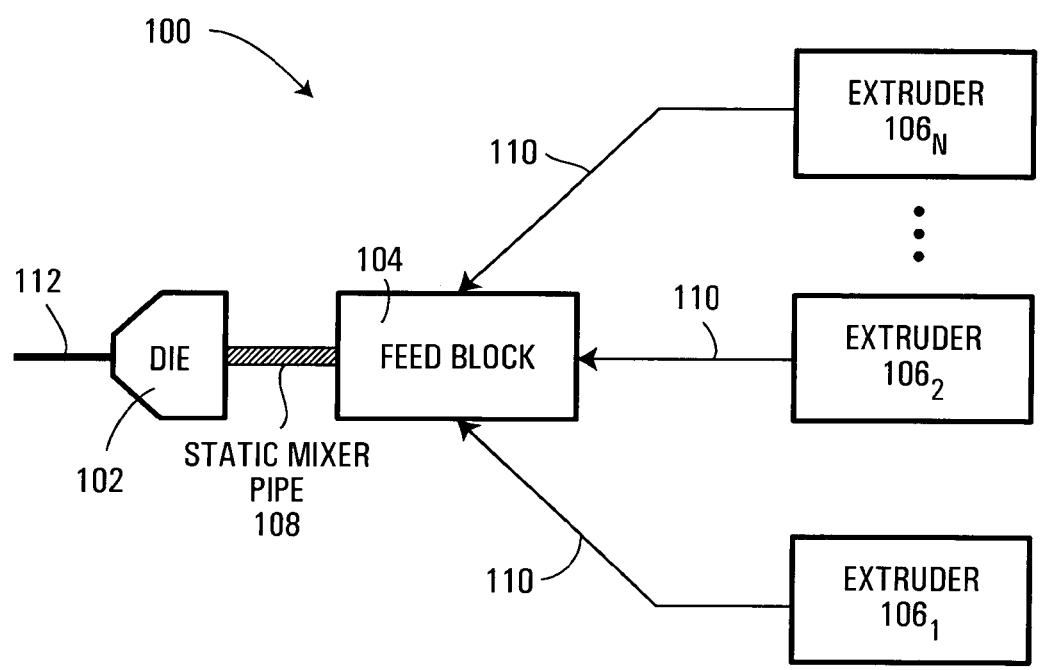
FIG. 1 illustrates a system for manufacturing plastic sheets, according to a non-limiting example of implementation of the present invention.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION

The present invention is directed to a process and apparatus for creating color effects in extruded material, such as plastic or metal.

In the following examples of implementation, the present invention will be described for use in creating color effects in extruded plastic material. However, the invention is not limited to any particular type of material. Rather, the application of the process and apparatus to various different types and grades of extrudable material is possible, and is included within the scope of the present invention.

FIG. 1 depicts a system 100 for manufacturing plastic sheets, according to a non-limiting example of implementation of the present invention. The system 100 is formed of several components, including a die 102, a feed block 104 and a plurality of extruders $106_1, 106_2, \ldots 106_N$, where the number N of extruders 106 in the system 100 is at least two.

Note that the system 100 may include three or more extruders 106, without departing from the scope of the present invention.

Each extruder 106 is operative to mix and heat plastic granules. The granules are heated to a predetermined temperature, sufficient to cause melting of the granules for producing a homogeneous, viscous plastic mixture.

Examples of the different types of thermoplastics that can be extruded include: LDPE, HDPE, ABS, polystyrene, polypropylene, acetates, butyrates, nylons, polyphenylene sulfides, acetals, polycarbonates and thermoplastic rubbers and polyesters, among other possibilities.

Typically, a controlled amount of colorant is added to the mixture in each extruder 106, for obtaining a viscous plastic mixture of a specific color. Different techniques, known in the art, may be used to color the plastic mixtures in the extruders 106. In one example, colorant in the form of granules is added to and mixed with the plastic granules before they are fed into the extruder 106 for melting. In another example, colorant in liquid form may be fed into the extruder for mixing with the plastic granules. Alternatively, the non-recycled plastic granules themselves can be pre-colored such that it is not necessary to add colorant to the mixture. In another alternative, recycled plastic granules of a specific color may be used in the extruders 106, such that the addition of a colorant is not required.

Each extruder 106 is configured to melt and mix the plastic granules such that the mixture 110 is perfectly melted and homogeneous, both in temperature and in color, upon its exit from the extruder 106.

Note that, with regard to the plastic mixture output by the extruders $106_1, 106_2, \ldots 106_N$, the term "melted" implies that the mixture is characterized by a viscous or semi-fluid flow. The plastic mixture 110 output by each extruder 106 is also referred to herein as a flow 110 of viscous plastic. Each extruder 106 may be set to a different rate of flow, for example 400 kg/hr, 300 kg/hr, 100 kg/hr or 50 kg/hr, among many other possibilities.

The structure and functionality of such extruders $106_1, 106_2, \ldots 106_N$ are well known to those skilled in the art, and will not be described in further detail.

In the context of the present invention, at least two of the extruders $106_1, 106_2, \ldots 106_N$ must be producing plastic mixtures 110 of different colors. In a specific, non-limiting example, the system 100 may include a pair of extruders 106, each of which is producing a plastic mixture 110 of a different color. In another example, the system 100 may include three extruders 106, each of which is producing a plastic mixture 110 of a different color. In yet another example, extruder $106_1$ is producing a plastic mixture 110 of a first color, while the remaining extruders $106_2$–$106_N$ are producing a plastic mixture 110 of a second color, different from the first color.

The feed block 104 is operative to combine the flows 110 of viscous plastic output by the different extruders $106_1, 106_2, \ldots 106_N$ into a single, multi-layer or multi-band, patterned stream of viscous plastic, as will be discussed further below. The terms "layer" and "band" will be used interchangeably hereinafter.

Figure 2:
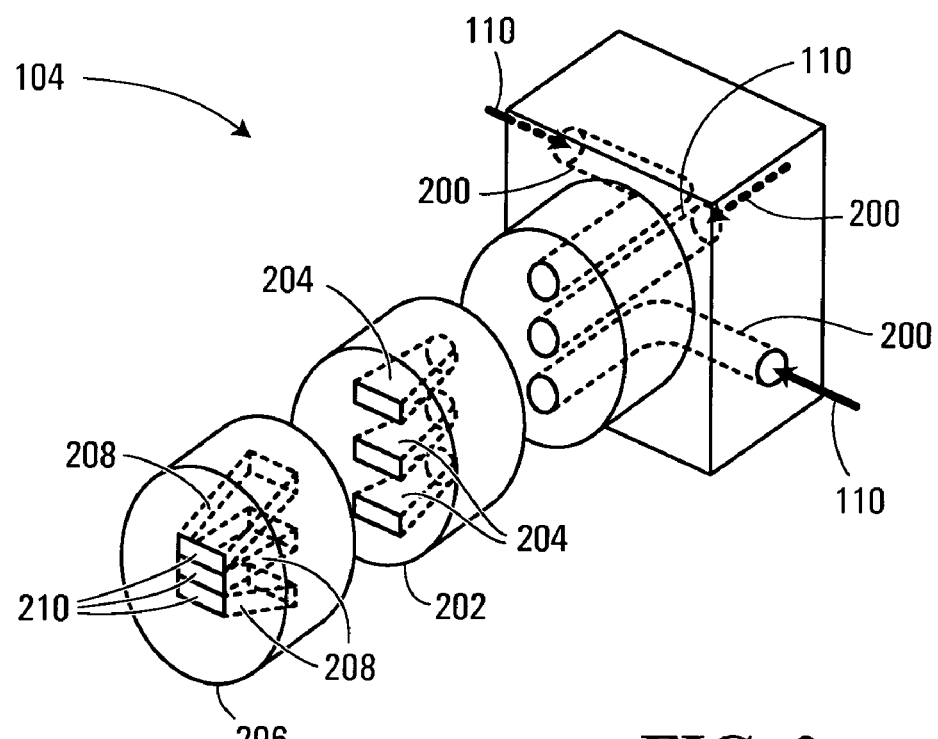
FIG. 2 depicts an example of a possible structural configuration for the feed block shown in FIG. 1.

FIG. 2 illustrates a non-limiting example of a possible configuration for the feed block 104, for the case in which the system 100 is formed of three extruders 106. Thus, the feed block 104 receives three distinct flows 110 of viscous plastic, each of which is input to the feed block 104 from the associated extruder 106 via a respective feed port 200.

The feed block 104 also includes a programming section 202, which receives the flows 110 from the feed ports 200 into corresponding channels 204. This programming section 202 is operative to shape and position the flows 110 according to a predetermined pattern, whereby the flows undergo a programming of sorts within the channels 204 in order to produce a desired pattern for the multi-band stream of viscous plastic. In the example shown in FIG. 2, the channels 204 of the programming section 202 are designed to produce a pattern of linear layers. However, different sizes, shapes and layouts for the channels 204 of the programming section 202 may also be used, in order to produce different patterns for the multi-band stream of viscous plastic.

Note that the programming section 202 of the feed block 104 may be designed to divide a particular flow 110 into two or more sub-flows 110, for producing a different pattern for the multi-band stream of viscous plastic. In a specific example, assume the feed block 104 receives two flows 110, one that is red in color and the other that is yellow in color. The programming section 202 may divide the red flow 110 into two red sub-flows, and orient these sub-flows such that the yellow flow 110 is sandwiched between the two red sub-flows, according to a particular layout and pattern.

Finally, the feed block 104 includes a transition section 206, operative to fuse together the separate flows 110, for generating the patterned, multi-band stream of viscous plastic. As seen in FIG. 2, the channels 208 of the transition section 206 are oriented such that their output ports 210 are located immediately adjacent one another. As the distinct flows 110 exit the respective output ports 210, the two flows of the viscous plastics, which are made of the same material and as such have the same fusion points, fuse together into a single, multi-band stream of viscous plastic.

In the context of the present invention, at least one pair of adjacent bands of the multi-band stream generated by the feed block 104 is characterized by bands of different colors. More specifically, at least one pair of adjacent bands is formed of a first band of viscous plastic of a first color and a second band of viscous plastic of a second color. In a specific, non-limiting example, the multi-band stream generated in FIG. 2 is formed of three bands, the first and third of which are orange in color, the second of which is blue in color. Thus, the blue band is sandwiched between the orange bands, such that each pair of adjacent bands is characterized by bands of two different colors.

As mentioned above, the multi-band stream output by the feed block 104 may take on different patterns, without departing from the scope of the present invention. Rather than a horizontal layer pattern, the feed block 104 may combine the different flows 110 according to a vertical layer pattern, a ring pattern, a tube pattern or a pie chart pattern, among many other possibilities. In the case of the ring pattern, each separate flow 110 of viscous plastic is formed into a concentric ring, where the rings of different colors are fused together to form a multi-band tube of viscous plastic, characterized by at least one pair of adjacent rings of different colors. In the case of the tube pattern, the separate flows 110 are positioned with respect to one another such that, when fused together, they form an elongate tube, characterized by at least one pair of adjacent longitudinal bands of different colors.

The use of feed blocks in extrusion processes is well known to those skilled in the art and, as such, the feed block structure and functionality will not be described in further detail herein.

Note that a uniform transition of the flows 110 from the extruders 106 to the feed ports 200 of the feed block 104, as well as from one component to another within the feed block 104, without any brusque variations in the channel dimensions, is necessary in order to avoid stagnation of the viscous plastic material.

Specific to the present invention, the multi-band stream of viscous plastic generated by the feed block 104 is fed through a static mixer pipe 108. The static mixer 108 is operative to act on the multi-band stream of viscous plastic, for partially mixing the adjacent bands of different colors in order to create color effects in the stream, more specifically color gradation effects.

Figure 3:
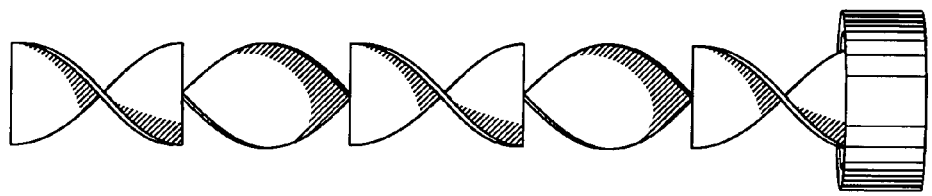
FIG. 3 is a perspective view of a helical static mixer.

Static mixers are known in the industry to be useful for effectively mixing fluids, by executing the operations of division of flow, radial mixing and flow reversal. The most common type of static mixer is the helical static mixer, as seen in the example of FIG. 3, which includes a series of static elements positioned adjacent another. Each element is formed of a rectangular plate twisted by 180 degrees, which splits the oncoming flow in half and then turns it through 180 degrees. Each element in the series is rotated 90 degrees with respect to the preceding element, so as to constantly subdivide the flow. When two fluids of different colors enter a static helical mixer pipe, the dividing and overturning motion applied to the fluids by the elements of the mixer results in a gradual mixing of the two fluids. More specifically, as the fluids go along the curves of each element, they are rotated radially towards the pipe wall, or rotated back to the center. Furthermore, as the fluids pass from one element to the next, the fluids are bisected and they change direction to the right or to the left, the force of inertia that suddenly occurs creating a strong flow reversal motion that results in stirring and mixing of the fluids.

Note that, for fluids of different types and/or viscosity, a different number of elements may be required in the static mixer in order to obtain a complete mixing of the two or more fluids from entry into the static mixer to output from the static mixer.

Figure 4:
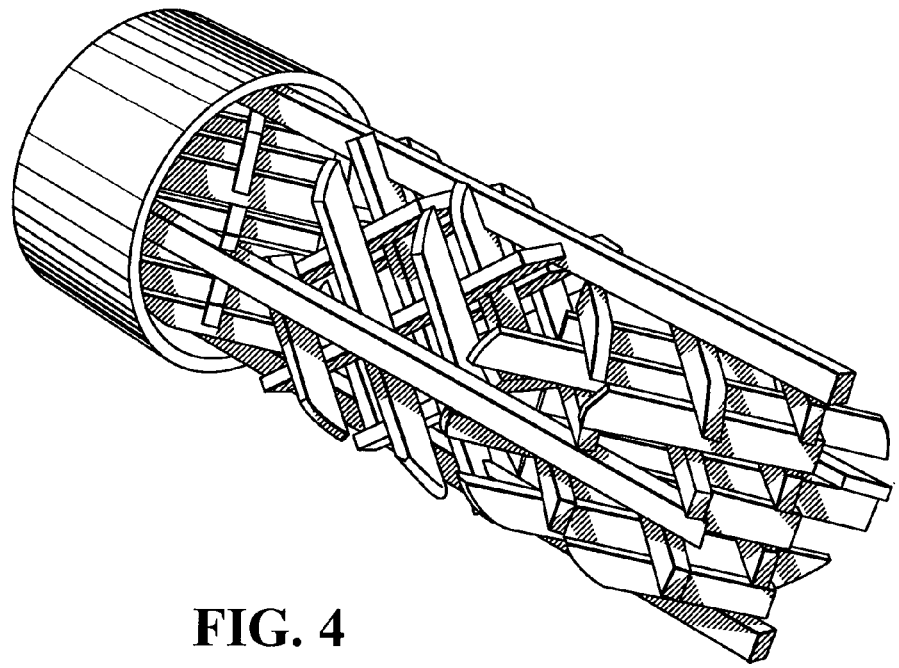
FIG. 4 is a perspective view of a different type of static mixer.

Different types of static mixers exist for uniformly mixing fluids in order to produce a homogenous mixture, such as the example shown in FIG. 4. Such static mixers are all designed around the same principle, notably passing the viscous fluids through a series of elements that cause the fluids to undergo different flow patterns resulting in the mixture of the fluids. The present invention is not limited to any particular type or design of static mixer.

Under the present invention, the static mixer 108 is characterized by a specific number of elements, such that, upon exit from the static mixer 108, only a partial mixing of the different colored bands of the multi-band stream has occurred, creating a blended, gradation in the colors of the multi-band stream.

More specifically, upon entering the static mixer pipe 108, the multi-band stream is characterized by at least one pair of adjacent bands of first and second colors, respectively. The static mixer 108 is operative to mix together a portion of each of the first and second bands such that, when the multi-band stream exits the static mixer 108, the stream is characterized by a third band of a third color, different from the first and second colors. It should be understood that the bands of color that exit the static mixer 108 are not necessarily clearly defined bands. In a first embodiment there can be a sharp transition between the color of one band and the color of an adjacent band, thereby creating clearly defined bands. However in an alternate embodiment, there can be a slow color gradation from the color of one band to the color of an adjacent band, such that the border between the two bands is not clearly defined. In addition, the shapes of the bands can vary. For example, the bands can be substantially straight, or can be wavy or curved. Likewise, the bands can be horizontally oriented, vertically oriented, or diagonally oriented at any angle between horizontally oriented and vertically oriented.

Typically, when the multi-band stream exits the static mixer 108, the third band of a third color is a combination of the colors of the first and second bands and is located between the first and second bands. For example, if the stream that is entered into the static mixer includes a first band that is yellow and a second band that is red, then typically, the multi-band stream that exits the static mixer will have a third band that is a shade of orange that is located between the red band and the yellow band.

Alternatively, when the multi-band stream exits the static mixer 108, the third band of the third color is not necessarily located between the first and second bands of the first and second color. Instead, it is possible that the third band of the third color is located between two bands of the first color, or two bands of the second color. For example, if the stream that is entered into the static mixer includes a first band that is white and a second band that is blue, then the multi-band stream that exits the static mixer will have a third band that is a lighter shade of blue. As such, it should be understood that for the purposes of the present invention, the third color can be a lighter shade of one of the first and second colors. In addition, it is possible that the multi-band stream that exits the static mixer 108 will not include a band of white, and that instead the multi-band stream includes a band of the light blue located between two bands of the blue that was entered into the static mixer.

Furthermore, one or more additional bands of color may also be present, located between the third band and either one of the first and second bands. These additional bands may be characterized by any one of: the first color, the second color, a blend of the first and second colors, a blend of the first and third colors or a blend of the second and third colors.

Thus, upon exiting the static mixer pipe 108, the multi-band stream is characterized by a gradation in color from the first color to the second color.

Note that the static mixer pipe 108 may include two or more static mixers, for acting simultaneously on different portions of the multi-band stream as the stream passes through the pipe 108.

Figure 5A:
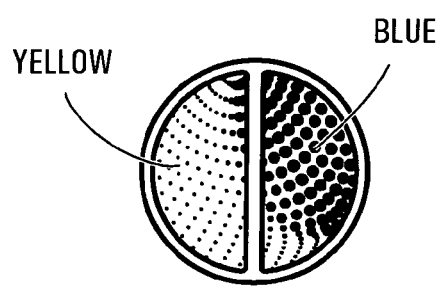
FIG. 5A illustrates a stream of viscous material as it enters the first element of a helical static mixer.
Figure 5B:
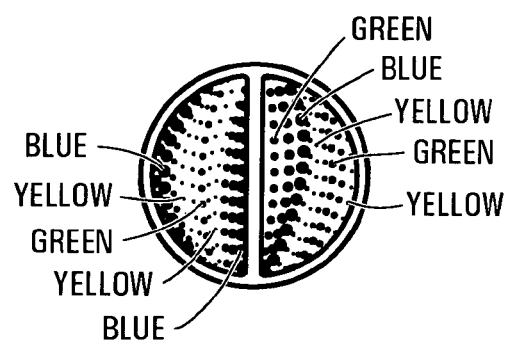
FIG. 5B illustrates a stream of viscous material as it exits the third element of a helical static mixer.

Take for example the case where the system 100 includes a first extruder 106 producing a flow 110 of yellow viscous plastic, and a second extruder 106 producing a flow 110 of blue viscous plastic. Assume that the feed block 104 is operative to combine these two separate flows 110 into a two-layer stream of viscous plastic, characterized by a band of yellow and a band of blue, the two bands being substantially equal in proportion within the stream. With reference to FIGS. 5A and 5B, as this multi-layer stream passes through the static mixer pipe 108, which in this example we will assume has a length of three elements, the two bands of color are partially mixed together. Thus, a third band, green in color, is created between the yellow and blue bands of the stream. Additional bands of color are also created, located between the green band and the yellow band, as well as between the green band and the blue band. Upon its exit from the static mixer 108, notably after passing through the third element, the multi-band stream of viscous plastic is characterized by a gradation in color from yellow to blue, and includes bands of at least three different colors.

Note that the length of the static mixer 108 that is necessary to obtain a partial mixing of the different colored bands of the multi-band stream of viscous plastic may vary for different implementations of the system 100. The present invention is not limited to any specific length, or number of elements, for the static mixer pipe 108.

The selection of an appropriate static mixer 108 is based on certain predetermined parameters, including the diameter, length and orientation of the elements themselves within the static mixer 108. Furthermore, the determination of the appropriate dimensions for the static mixer 108 will depend on the type of plastic material in use within the system 100, as well as the respective rate of flow for each extruder 106 and the total rate of flow for the multi-band stream output by the feed block 104

In a specific, non-limiting example, in order to create a sheet of plastic having a red-orange-yellow appearance once it has exited the static mixer, a first extruder having a 3½ inch diameter at 20 rpm is supplied with new plastic granules and 4% red colorant, and a second extruder having a 4½ inch diameter at 75 rpm is supplied with new plastic granules and 4% yellow colorant. From the extruders, viscous flows of red and yellow plastic are fed into a feedblock that forms the flows of red and yellow plastic into a stream of adjacent bands, which it feeds into a helical static mixer having a 2½ inch diameter made of 3 elements.

In another specific, non-limiting example, in order to create a sheet of plastic having a blue, white and light blue appearance once it has exited the static mixer, a first extruder having a 3½ inch diameter at 50 rpm is supplied with new plastic granules and 2% white colorant, and a second extruder having a 1½ inch diameter at 20 rpm is supplied with new plastic granules and 4% blue colorant. From the extruders, the flows of white and blue viscous plastic are fed into a feedblock that forms the two flows into a three layer stream of blue, white and blue which it feeds into a helical static mixer having a 2 inch diameter made of 6 elements.

Note that different orientations of the static mixer 108 with respect to the longitudinal plane of the multi-band stream will result in different patterns of color gradation in the multi-band stream at the output of the static mixer pipe 108. For example, in the case of a helical static mixer 108, if the last element of the static mixer 108 is oriented horizontally with respect to the plane of the multi-band stream of viscous plastic, the static mixer 108 will tend to produce longitudinal bands of color in the multi-band stream. In contrast, if the last element is oriented vertically with respect to the plane of the multi-band stream of viscous plastic, the static mixer 108 will tend to produce vertical bands of color in the multi-band stream.

Furthermore, different orientations of the static mixer 108, as well as different rates of flow for the different extruders 106, may produce colored bands of different widths within the multi-band stream of viscous plastic. Thus, the final color pattern achieved in the multi-band stream of viscous plastic by the static mixer 108, including both band width and color dominance, is dependent on the respective rate of flow of the extruders 106, as well as on the orientation of the static mixer 108.

The die 102 receives the multi-band stream of viscous plastic from the static mixer pipe 108, and is operative to shape the multi-band stream into its final product form, such as a sheet or a tube, among many other possibilities. In the non-limiting example shown in FIG. 1, the die 102 is operative to produce sheets of plastic 112 from the multi-band stream of viscous plastic. Different shapes and sizes of dies may be used within the system 100 to generate different forms and types of plastic products. The structure and functionality of such dies are well known to those skilled in the art, and as such will not be described in further detail herein.

Figures 6A, 6B:
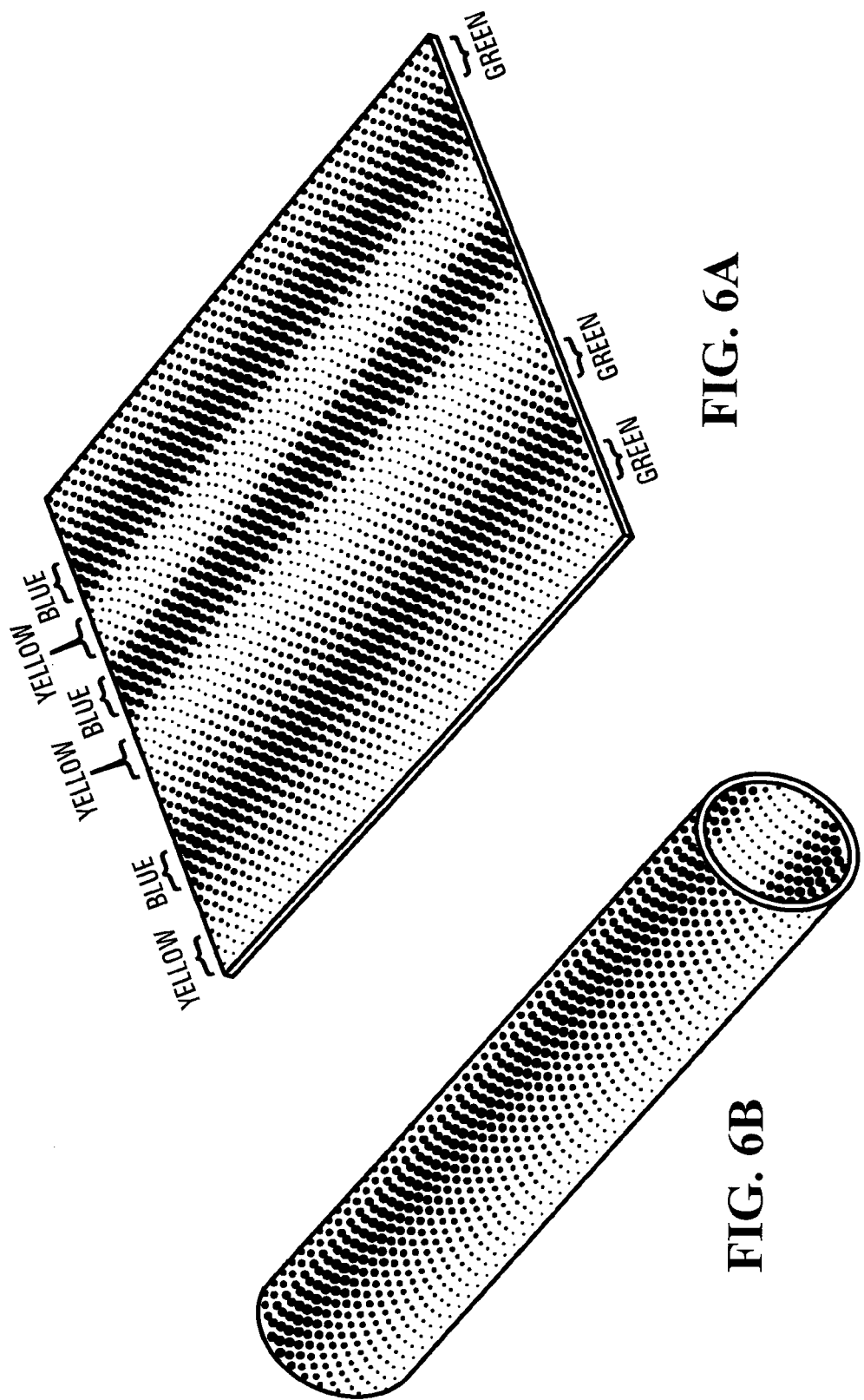
FIG. 6A depicts a sheet of plastic with color gradation effects.
FIG. 6B depicts a tube of plastic with color gradation effects.

FIGS. 6A and 6B illustrate two examples of products that may be formed by the die 102. In FIG. 6A is shown an example of a sheet of plastic resulting from the two-color (yellow and blue) extrusion process described above. In its final product form, the sheet of plastic is characterized by bands of yellow (the color from the first extruder 106), bands of blue (the color from the second extruder 106) and bands of green, the latter resulting from the mixing of the yellow and blue bands by the static mixer 108. Between the yellow and blue bands is a blended, color gradation, from one color to the other.

In FIG. 6B is shown an example of a tube of plastic resulting from the same two-color extrusion process.

The product resulting from the extrusion process described herein, such as the sheet or tube of plastic, may be used as is, in different applications. For example, the sheets of plastic may be cut out to form tobogganing carpets, also referred to as crazy carpets. Alternatively, the product resulting from the extrusion process may be thermoformed into different shapes or final products. For example, the sheets of plastic characterized by the color gradation effects may be thermoformed into pedal boats, kayaks, canoes or other similar watercraft products. They may also be thermoformed into recreational products, such as toboggans and pools, among many other possibilities. Whether thermoformed or not, the main use and advantage of the extruded product resulting from the above-described extrusion process is to provide an esthetically appealing appearance to the consumer or user.

Figure 7:
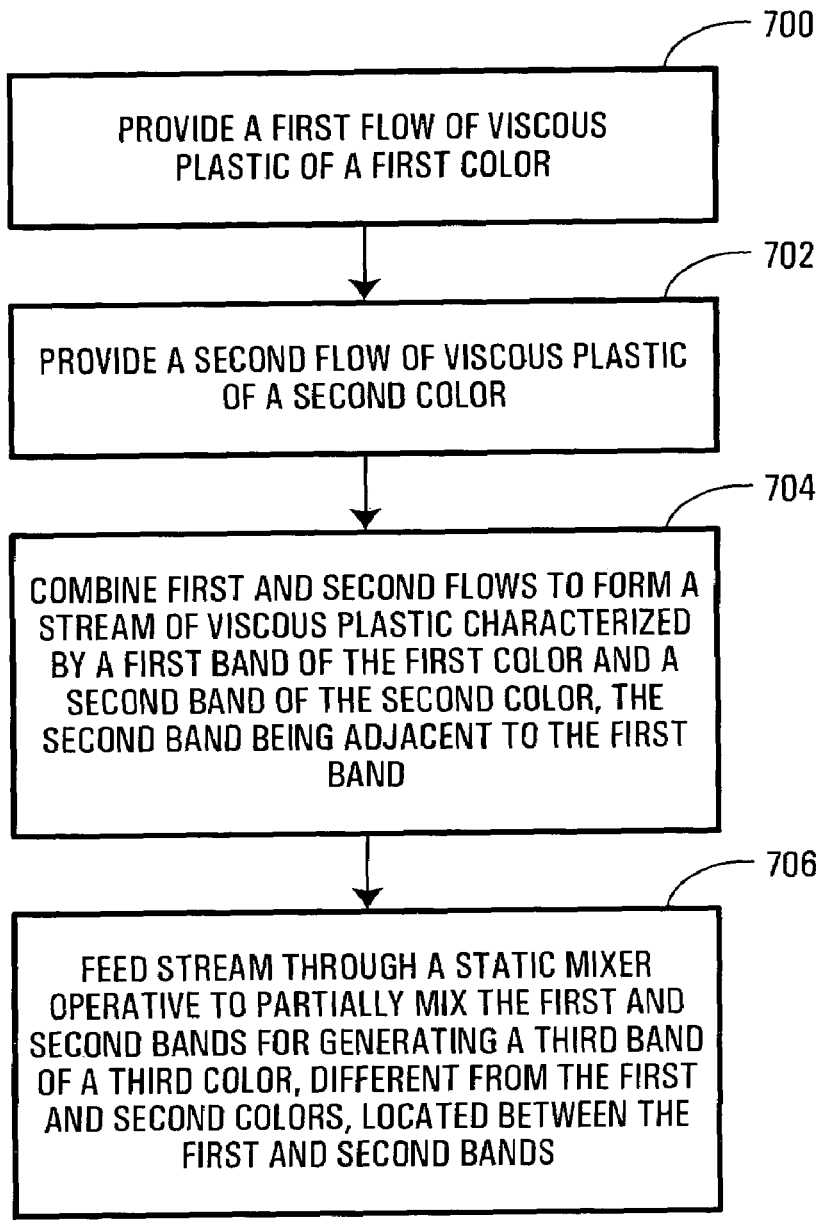
FIG. 7 is a flowchart illustrating the overall process for creating color effects in extruded plastic material, according to an example of implementation of the present invention.

In FIG. 7 is shown a flowchart illustrating the overall process implemented by the system 100 for creating color gradation effects in extruded plastic material. At step 700, a first flow of viscous plastic of a first color is provided. At step 702, a second flow of viscous plastic of a second color, different from the first color, is provided. At step 704, the first and second flows are combined together to form a stream of viscous plastic, where this stream is characterized by a first band of the first color and a second band of the second color, the second band being adjacent to the first band. Next, at step 706, the stream is fed through a static mixer operative to partially mix the first and second bands such that, upon exiting the static mixer, the stream is further characterized by a third band of a third color, different from the first and second colors, located between the first and second bands.

Note that the above process is applicable to various different types of extrudable material, and is not limited to plastic applications.

Figure 8:
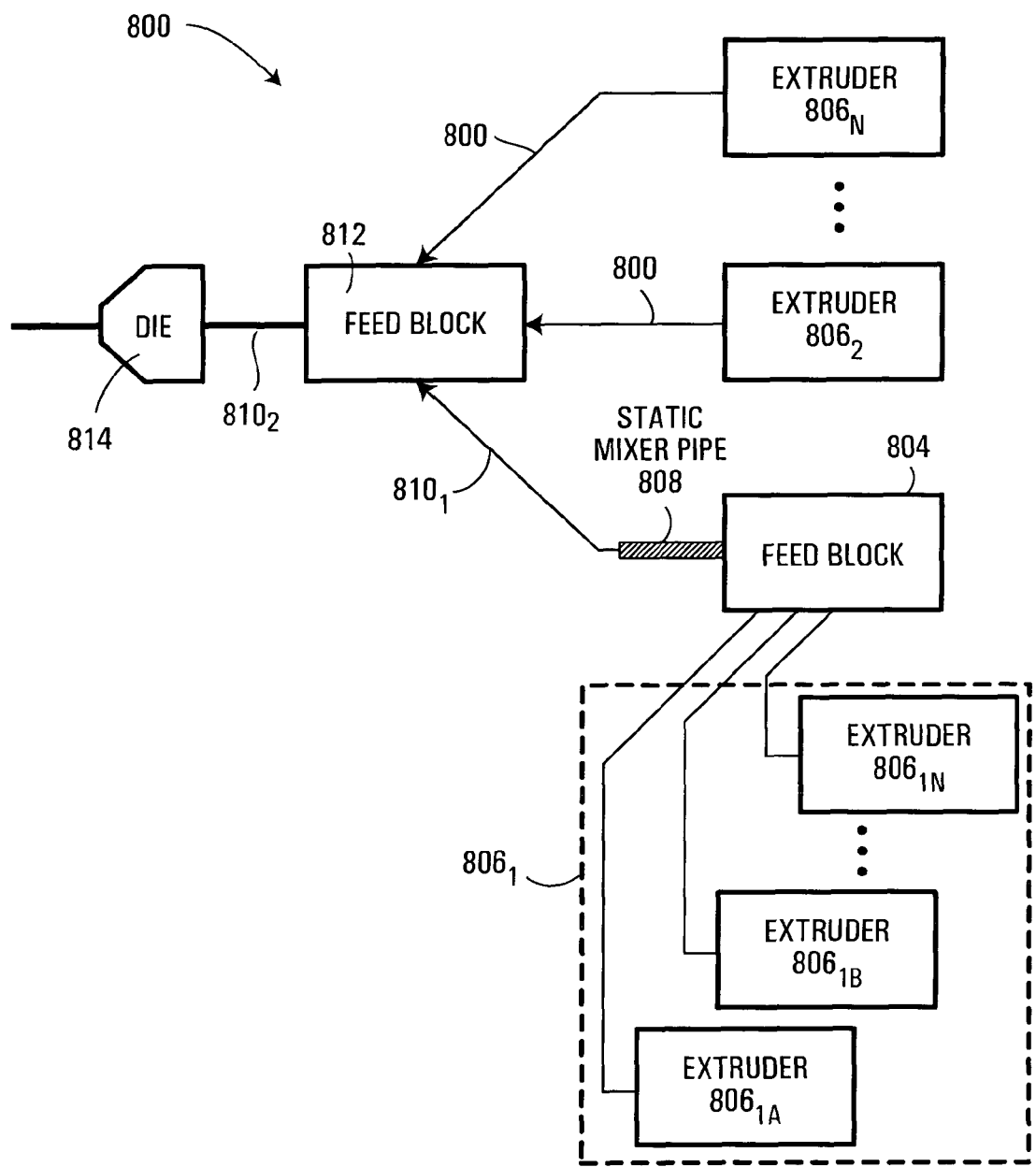
FIG. 8 depicts a system for manufacturing plastic sheets, according to a variant example of implementation of the present invention.

FIG. 8 illustrates a variant example of implementation of the present invention, in which the system 800 manufactures plastic products, such as plastic sheets, with color gradation effects being provided only in one or more surface layers of the product. In this case, extruder $806_1$, which includes extruders $806_{1A}$, $806_{1B}$, ... $806_{1N}$, in combination with the feed block 804 and the static mixer 808, produces a stream of viscous plastic $810_1$ characterized by color gradation effects, in the same way as described above with regard to the system 100. This stream $810_1$ is then fed into a combining device where it is combined with the separate flows 800 of viscous plastic output by the extruders $806_2$, ... $806_N$. In the specific example shown in FIG. 8, the combining device includes the feed block 812. The feed block 812 produces a co-extruded stream of viscous plastic $810_2$, having at least one layer, typically a surface layer, characterized by the color gradation effects. The die 814 then receives this co-extruded stream $810_2$, and is operative to mold the plastic stream into its final form, for example a sheet or a tube.

Note that the feed blocks 804 and 812 are similar in structure and functionality to that described above with regard to the feed block 104.

In an alternative embodiment wherein the die 814 is able to combine the streams from the static mixer pipe 808 and the extruders $806_2$–$806_N$ into a co-extruded sheet prior to forming the sheet into its final form, the feedblock 812 can be omitted, and the combining device simply includes the die 814.

Thus, in this variant example of implementation, plastic products are formed in which the color gradation effects may be limited to an outer surface of the product. Note that, in this case, one or more of the extruders $806_2$, ... $806_N$ may be fed with recycled plastic granules, if the respective one or more layers of plastic generated by these extruders are not visible on the finished product. Alternatively, each of the extruders $806_2$, ... $806_N$ may be producing a plastic mixture of a predetermined and specific color, depending on the specific applications and end products being formed.

Note that any one of the extruders $806_2$, ... $806_N$ may be set up in the same way as extruder $806_1$, such that two or more layers of the final plastic product are characterized by color gradation effects. These color gradation effects may differ from one layer to another, since the extruder flow rates and static mixer orientations may vary from one extruder arrangement to the other.

Alternatively, the die 814 may be provided with multiple feed ports, such that the die 814 itself could directly receive the stream of viscous plastic $810_1$ from the extruder $806_1$, as well as the flows 800 from the extruders $806_2$, ... $806_N$. Thus, the die 814 would act to combine the stream 810, and the flows 800 into the co-extruded stream of viscous plastic $810_2$, after which the die 814 would shape the stream $810_2$ into the final product form. Note that, in this case, the die 814 takes on the responsibility of the feed block 812, which is no longer required within the system 800.

Although various embodiments have been illustrated, this was for the purpose of describing, but not limiting, the invention. Various modifications will become apparent to those skilled in the art and are within the scope of this invention, which is defined more particularly by the attached claims.

I claim:

1. A process for creating color effects in extrudable material, said process comprising:
    a) providing a first flow of viscous material of a first color;
    b) providing a second flow of viscous material of a second color, said second color being different from said first color;
    c) combining in a predetermined pattern said first flow and said second flow to form a stream of viscous material, said stream comprising a first band of said first color and a second band of said second color, said second band being adjacent to said first band;
    d) in a static mixer having a predetermined number of elements and a predetermined diameter, applying a predetermined dividing, overturning and combining motion to said stream for a predetermined number of times thereby partially mixing said first band and said second band, such that said first and second bands remain in the stream and said stream further comprises a third band of a third color that is different from said first and second colors,
    wherein said predetermined dividing, overturning and combining motion is determined by said predetermined number of elements and said predetermined diameter of the static mixer, and wherein said predetermined number of elements and said predetermined diameter are determined by a parameter selected from the type of viscous material, viscosity of said first and second flow of viscous material, the respective rate of flow of said first and second flows, the total rate of flow of said stream, and combinations thereof.

2. A process as defined in claim 1, wherein said third band is located between said first band and said second band.

3. A process as defined in claim 1, wherein said third color is a mix of said first and second colors.

4. A process as defined in claim 1, wherein said first, second and third bands of said stream form horizontal layers.

5. A process as defined in claim 1, wherein said first, second and third bands of said stream form vertical layers.

6. A process as defined in claim 1, wherein said first, second and third bands of said stream form concentric layers.

7. A process as defined in claim 1, wherein said dividing, overturning and combining motion for a predetermined specific number of times is provided by a static mixer.

8. A process as defined in claim 7, wherein said static mixer includes a helical mixer.

9. A process as defined in claim 1, wherein after being submitted to said dividing, overturning and combining motion for a predetermined specific number of times, said stream further comprises at least one additional band located between said third band and either one of said first and second bands.

10. A process as defined in claim 9, wherein said at least one additional band comprises a color selected from: said first color; said second color; a blend of said first and second colors; a blend of said first and third colors; and a blend of said second and third colors.

11. A process as defined in claim 10, wherein said at least one additional band provides for a gradation in color from either one of said first and second colors to said third color.

12. A process as defined in claim 1, wherein after applying the dividing, overturning and combining motion for a predetermined number of times, said process includes the step of forming said stream of viscous material into a sheet.

13. A process as defined in claim 1, wherein after applying the dividing, overturning and combining motion for a predetermined number of times, said process includes the step of forming said stream of viscous material into a tube.

14. A process as defined in claim 1, wherein said viscous material is viscous plastic.

15. A process as defined in claim 1, wherein said first, second and third bands of said stream form diagonal layers.

16. A process for manufacturing a sheet from extrudable material, said process comprising:

a) providing a first flow of viscous material of a first color;

b) providing a second flow of viscous material of a second color, said second color being different from said first color;

c) combining in a predetermined pattern said first flow and said second flow to form a stream of viscous material, said stream comprising a first band of said first color and a second band of said second color, said second band being adjacent to said first band;

d) in a static mixer having a predetermined number of elements and a predetermined diameter, applying a predetermined dividing, overturning and combining motion to said stream for a predetermined number of times thereby partially mixing said first band and said second band, such that said first and second bands remain in the stream and said stream further comprises a third band of a third color that is different from said first and second colors, said third band being located between said first and second bands;

e) after applying the dividing, overturning and combining motion for a predetermined number of times, feeding said stream through a die for forming a sheet of material comprising a gradation of color, wherein said predetermined dividing, overturning and combining motion is determined by said predetermined number of elements and said predetermined diameter of the static mixer, and wherein said predetermined number of elements and said predetermined diameter are determined by a parameter selected from the type of viscous material, viscosity of said first and second flow of viscous material, the respective rate of flow of said first and second flows, the total rate of flow of said stream, and combinations thereof.

17. A process as defined in claim 16 for manufacturing plastic articles comprising color gradation effects.

18. A process as defined in claim 16 for manufacturing plastic kayaks comprising color gradation effects.

* * * * *